United States Patent
Palomba et al.

(10) Patent No.: US 11,280,197 B2
(45) Date of Patent: Mar. 22, 2022

(54) TURBINE UNIT FOR AIRCRAFT TURBINE ENGINE WITH IMPROVED DISC-COOLING CIRCUIT

(71) Applicant: SAFRAN AIRCRAFT ENGINES, Paris (FR)

(72) Inventors: Camille Maryse Martine Palomba, Moissy-Cramayel (FR); Erwan Perrot, Moissy-Cramayel (FR); Antoine Frédéric Jean Satre, Moissy-Cramayel (FR); Marc-Antoine Anatole Got, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 60 days.

(21) Appl. No.: 16/787,376

(22) Filed: Feb. 11, 2020

(65) Prior Publication Data
US 2020/0256193 A1    Aug. 13, 2020

(30) Foreign Application Priority Data
Feb. 12, 2019 (FR) .................................... 1901396

(51) Int. Cl.
*F01D 5/08* (2006.01)

(52) U.S. Cl.
CPC ........ *F01D 5/081* (2013.01); *F05D 2220/323* (2013.01); *F05D 2240/24* (2013.01); *F05D 2240/55* (2013.01); *F05D 2260/232* (2013.01)

(58) Field of Classification Search
CPC . F01D 5/081; F01D 5/02; F01D 5/141; F01D 5/3007; F01D 5/3015;
(Continued)

(56) References Cited

U.S. PATENT DOCUMENTS 3,455,537 A * 7/1969 Ciavola ................. F01D 5/3015
                                                    415/134
5,030,063 A * 7/1991 Berger ................. F01D 11/006
                                                    416/220 R
(Continued)

FOREIGN PATENT DOCUMENTS

EP        2626518 A1     8/2013
FR        2825748 A1    12/2002
(Continued)

OTHER PUBLICATIONS

Preliminary Search Report issued in French Patent Application No. 1901396 dated Nov. 4, 2019.

*Primary Examiner* — Justin D Seabe
*Assistant Examiner* — Ryan C Clark
(74) *Attorney, Agent, or Firm* — Pearne & Gordon LLP (57) ABSTRACT

A turbine unit for an aircraft turbine engine, comprises a rotor disc (17) axially continued by a rim (36) and carrying rotary blades (18) defining together with the disc (17) channels for air flow (43); an annular flange (33) including a bearing end (34) and defining together with the rim (36) an air passage (42) communicating with the channels for air flow (43); a member (32) for axially retaining the blades applied against the disc (17) by the bearing end (34), this turbine unit being characterised in that at least one element, out of the retaining member (32) and the flange (33), comprises a groove (44) formed facing the other element, out of the retaining member (32) and the flange (33), and into which a sealing joint (45) against which the other element axially bears is inserted.

16 Claims, 10 Drawing Sheets

(58) Field of Classification Search
CPC ............ F01D 11/006; F05D 2220/323; F05D 2240/55; F05D 2240/24; F05D 2260/232
See application file for complete search history.

(56) References Cited

U.S. PATENT DOCUMENTS

| | | | | |
|---|---|---|---|---|
| 5,277,548 | A * | 1/1994 | Klein | F01D 11/008 416/193 A |
| 6,464,453 | B2 * | 10/2002 | Toborg | F01D 5/081 415/115 |
| 7,866,950 | B1 * | 1/2011 | Wilson, Jr. | F01D 5/147 416/225 |
| 9,890,652 | B2 * | 2/2018 | Judet | F01D 5/082 |
| 10,184,345 | B2 * | 1/2019 | Himes | F04D 29/322 |
| 10,196,895 | B2 * | 2/2019 | Weinert | F01D 9/02 |
| 10,267,172 | B2 * | 4/2019 | Leduc | F01D 5/3015 |
| 10,480,338 | B2 * | 11/2019 | Webb | F01D 5/326 |
| 2013/0202433 | A1 * | 8/2013 | Hafner | F01D 5/3015 415/230 |
| 2014/0286756 | A1 * | 9/2014 | Hile | F01D 5/3015 415/134 |
| 2016/0090841 | A1 * | 3/2016 | Himes | F01D 5/3007 416/95 |
| 2017/0159440 | A1 * | 6/2017 | Willett, Jr | F01D 5/24 |

FOREIGN PATENT DOCUMENTS

| | | | |
|---|---|---|---|
| GB | 2268979 | A | 1/1994 |
| GB | 2538389 | A | 11/2016 |

* cited by examiner

TURBINE UNIT FOR AIRCRAFT TURBINE ENGINE WITH IMPROVED DISC-COOLING CIRCUIT

This application claims priority from French Patent Application 1901396 filed Feb. 12, 2019, the entire content of which is incorporated by reference herein.

TECHNICAL FIELD

The invention relates to a turbine unit for an aircraft turbine engine, and more specifically to the issue of cooling a rotor disc.

PRIOR ART

In a turbine engine, the turbine blades placed downstream of the combustion chamber are subjected to severe temperature conditions. For this purpose, it is known to cool these blades with a cooling fluid, generally air, taken in at the blade root to move along an internal circuit and be evacuated out of the blade by holes distributed on the aerodynamic walls of the blade.

In practice, the heightened needs in terms of performance of the turbine engines involve increasing the temperatures at the outlet of the combustion chamber more and more, thus leading to also considering the cooling of the turbine discs carrying the blades. From the document FR2825748, it is known to ensure this cooling by air, taken upstream of the turbine, which circulates in passages defined between the blade roots and grooves formed in the disc and in which these roots are installed, as well as in a space defined between the disc and an annular flange. This flange, constrained to rotate with the disc, participates in particular in maintaining the blade in position by pressing an axial retaining ring against the disc and the root of the blades.

It has been observed, however, that air escapes out of the spaces defined for the propagation of the cooling air, in particular at the interface between the flange and the retaining ring. As soon as the lost air does not participate in the cooling of the disc, it is desirable to limit as best as possible these leaks of air. This sealing issue is even more complex given that the design space provided between the flange and the disc is small.

The goal of the invention is therefore to propose a solution allowing to limit these leaks, in other words to force as best as possible the flow of cool air to conform to the surface of the disc by traveling through the spaces defined between this disc and the flange.

DESCRIPTION OF THE INVENTION

For this purpose, the object of the invention is a turbine unit for an aircraft turbine engine, comprising:
a rotor disc that extends around an axis while being continued axially along the axis by a rim, this rotor disc carrying a plurality of radial blades each comprising a root inserted into a corresponding axial cell formed on the periphery of the rotor disc, so that each pair formed by a cell and a root defines, between the cell and the root, an axial channel for air flow;
an annular flange, constrained to rotate with the rotor disc, extending axially towards the rotor disc, and which has a bearing end extending radially towards the outside beyond the channels for air flow while defining together with the rim an air passage communicating with the channels for air flow;
a retaining member for axially retaining each of the blades in the corresponding cell, this retaining member being applied against the rotor disc by the bearing end of the annular flange,
this turbine unit being characterised in that at least one element out of the retaining member and the annular flange comprises a groove extending in a circumferential direction and formed facing the other element out of the retaining member and the annular flange, a sealing joint being inserted into the groove and against which said other element axially bears.

The invention thus allows to meet the need stated above, by providing a sealing joint thus preventing the air from escaping at the interface between the annular flange and the retaining member.

The invention also relates to a unit as defined, wherein the sealing joint is mounted precompressed in the groove.

The invention also relates to a unit as defined, wherein the joint has a coefficient of thermal expansion greater than that of the rotor disc, of the flange and of the retaining member.

The invention also relates to a unit as defined, wherein the retaining member comprises at least one slot that radially passes through the retaining member and at which the annular flange does not bear against this retaining member, and wherein the groove is formed in the retaining member in such a way that the sealing joint extends circumferentially at least along this slot.

The invention also relates to a unit as defined, wherein the retaining member is formed by an alternation of first and second angular segments arranged circumferentially and in each of which a respective groove segment is formed, so that the respective groove segments of the first and second angular segments extend in the circumferential continuation of each other to form the groove, the angular segments further defining two by two a slot.

The invention also relates to a unit as defined, wherein the first and second angular segments each comprise a respective body having a flat shape, and a median part axially protruding and disposed circumferentially at a distance from the circumferential ends of the body.

The invention also relates to a unit as defined, wherein said at least one slot is provided with a sealing member running along the entire length thereof, the sealing member being in the form of a coiled metal strip having its circumferential ends each bearing against a circumferential slot end.

The invention also relates to a unit as defined, wherein the groove is formed at the bearing end of the annular flange, this bearing end comprising a first and a second portions provided to bear against the retaining member while being located radially on either side of the groove, and wherein the second bearing portion has a free radially outer end and is in the form of a tab, the thickness of which decreases as it moves away radially towards the outside.

The invention also relates to a turbine for an aircraft turbine engine comprising at least one unit as defined, the turbine preferably being a low-pressure turbine.

The invention also relates to an aircraft turbine engine comprising at least one turbine as defined, the turbine engine preferably being a two-spool turbine engine.

BRIEF DESCRIPTION OF THE DRAWINGS

This description will be made with regard to the appended drawings among which.

DETAILED DESCRIPTION OF SPECIFIC EMBODIMENTS

Figure 1:
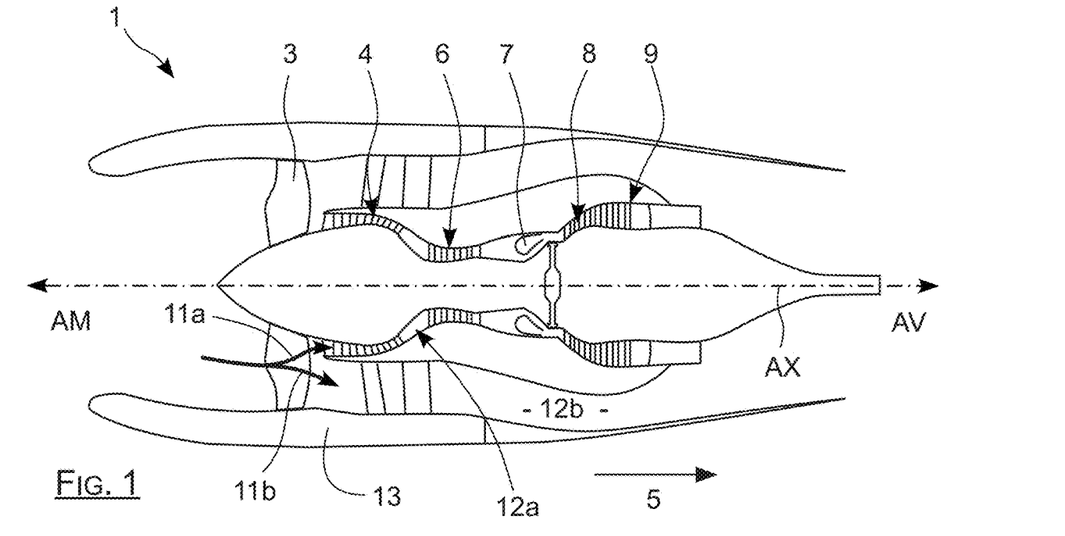
FIG. 1 is a functional diagram of a bypass turbojet in an axial cut according to the invention.

In reference to FIG. 1, an aircraft turbine engine 1 is shown, according to a preferred embodiment of the invention. Here, it is a two-spool bypass turbojet. Nevertheless, it could be a turbine engine of another type, for example a turboprop engine, without going beyond the context of the invention.

The turbine engine 1 has a central axis AX around which its various components extend. It comprises, from upstream AM to downstream AV in a main direction 5 of flow of the gases through this turbine engine, a fan 3, a low-pressure compressor 4, a high-pressure compressor 6, a combustion chamber 7, a high-pressure turbine 8 and a low-pressure turbine 9.

Conventionally, after passing through the fan, the air is divided into a central primary flow 11a and a secondary flow 11b that surrounds the primary flow. The primary flow 11a flows in a main duct 12a for circulation of the gasses passing through the compressors 4, 6, the combustion chamber 7 and the turbines 8, 9. As for the secondary flow 11b, it flows in a bypass duct 12b defined radially toward the outside by an engine casing, surrounded by a nacelle 13.

Figure 2:
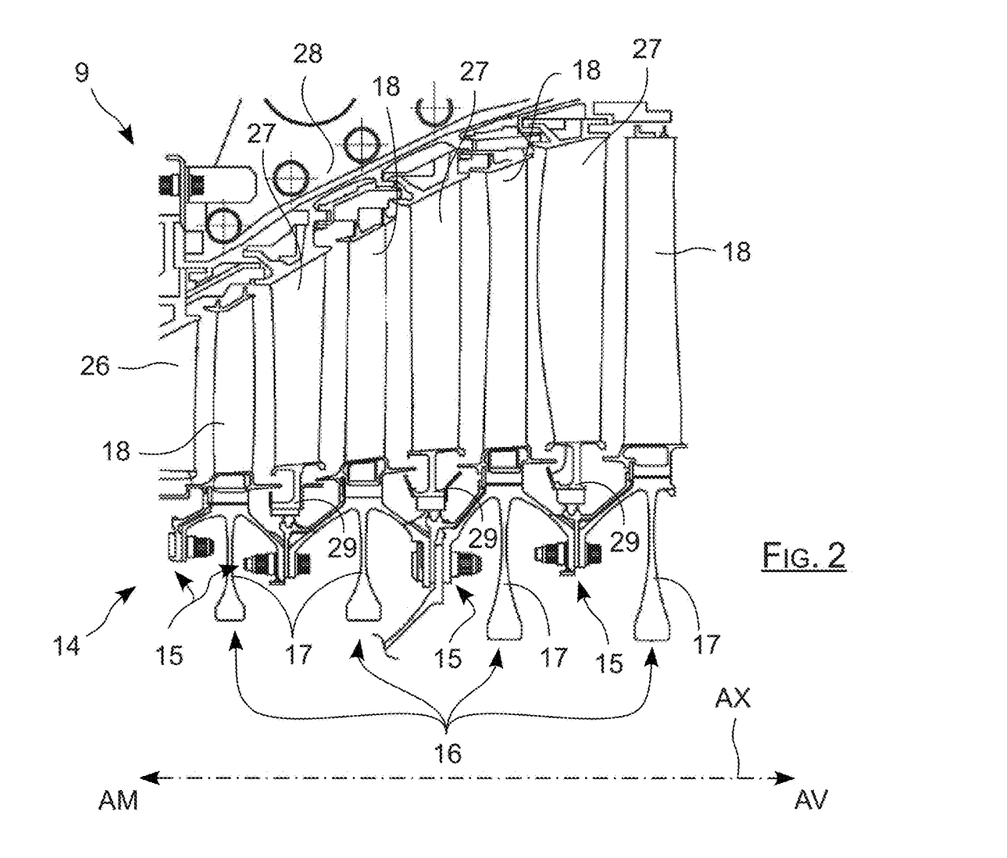
FIG. 2 illustrates a schematic half-view of a low-pressure turbine of a turbine engine according to the invention.
Figure 3:
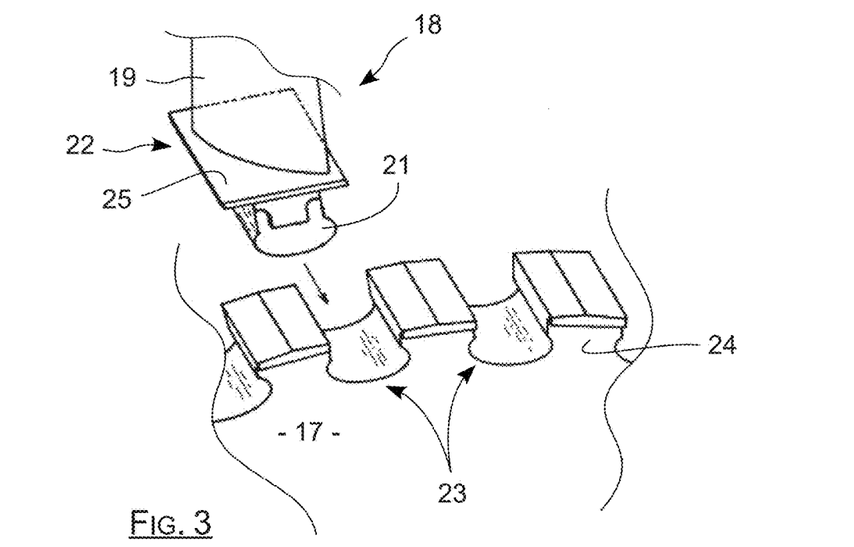
FIG. 3 partially shows, in an exploded view and schematically, a disc provided with a blade according to the invention.

FIG. 2 shows a part of the low-pressure turbine 9. Nevertheless, the invention could also apply to the high-pressure turbine 8, without going beyond the context of the invention. This low-pressure turbine 9 comprises a rotor 14 including a plurality of wheels, here labelled as 16 and four in number as an example, fastened to each other by clamping 15 and each comprising a rotor disc 17, having an axis of revolution AX, carrying a cascade of rotary blades 18. As is better visible in FIG. 3, these blades 18 distributed circumferentially around the rotor disc 17 each comprise an aerodynamic part 19, also called airfoil, a root 21, and a platform 22 which connects the airfoil to the root. The blades are installed on the rotor disc 17 by being inserted into cells 23 formed on the periphery of the latter, the cells being regularly spaced apart from each other while defining two by two teeth labelled as 24. With their outer surface 25, the platforms 22 thus define, radially towards the inside, the main duct 12a.

The turbine has in particular, between each pair of two successive wheels 16, a distributor 26 comprising an annular row of fixed blades 27. These fixed blades are fastened to the low-pressure turbine 9, and more precisely at their radially outer end with respect to the axis AX onto an outer turbine casing 28, and at their radially inner end onto a fixed ferrule sector 29.

Figure 4:
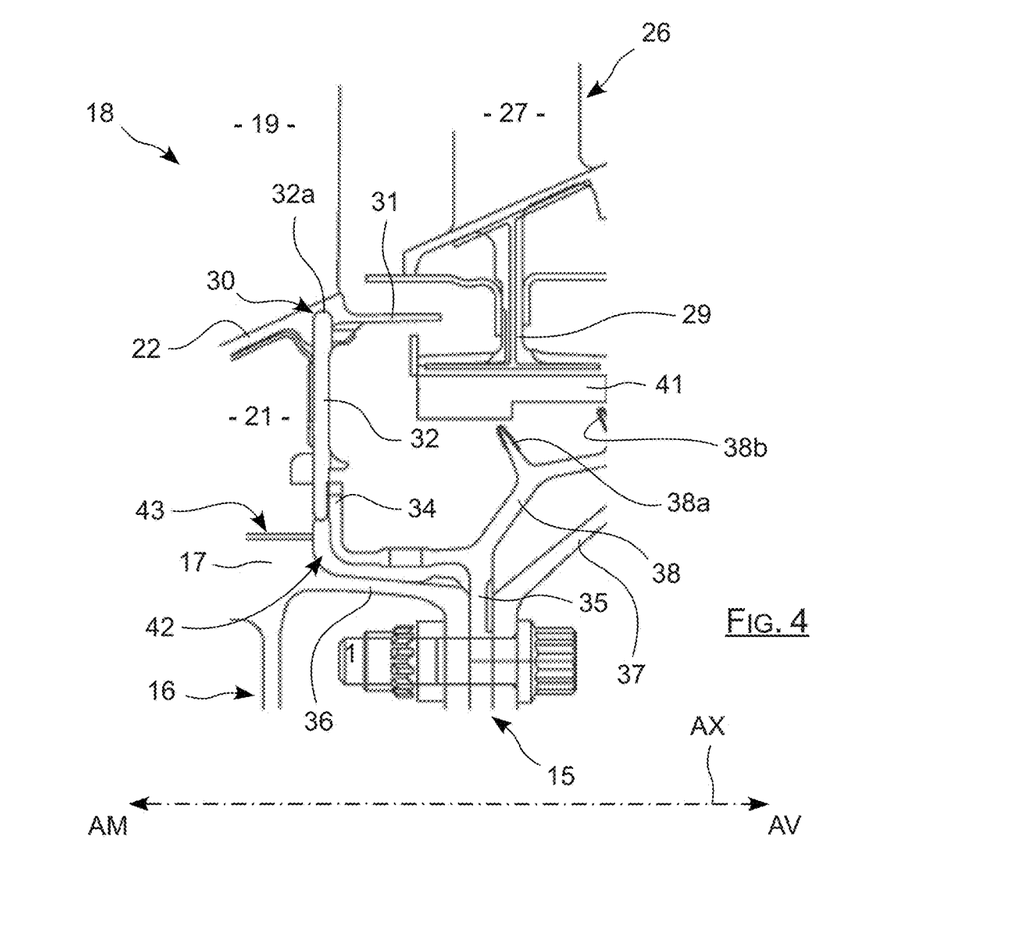
FIG. 4 is a detailed view of FIG. 2 illustrating a turbine unit comprising a movable wheel followed by a distributor.
Figures 5, 5A:
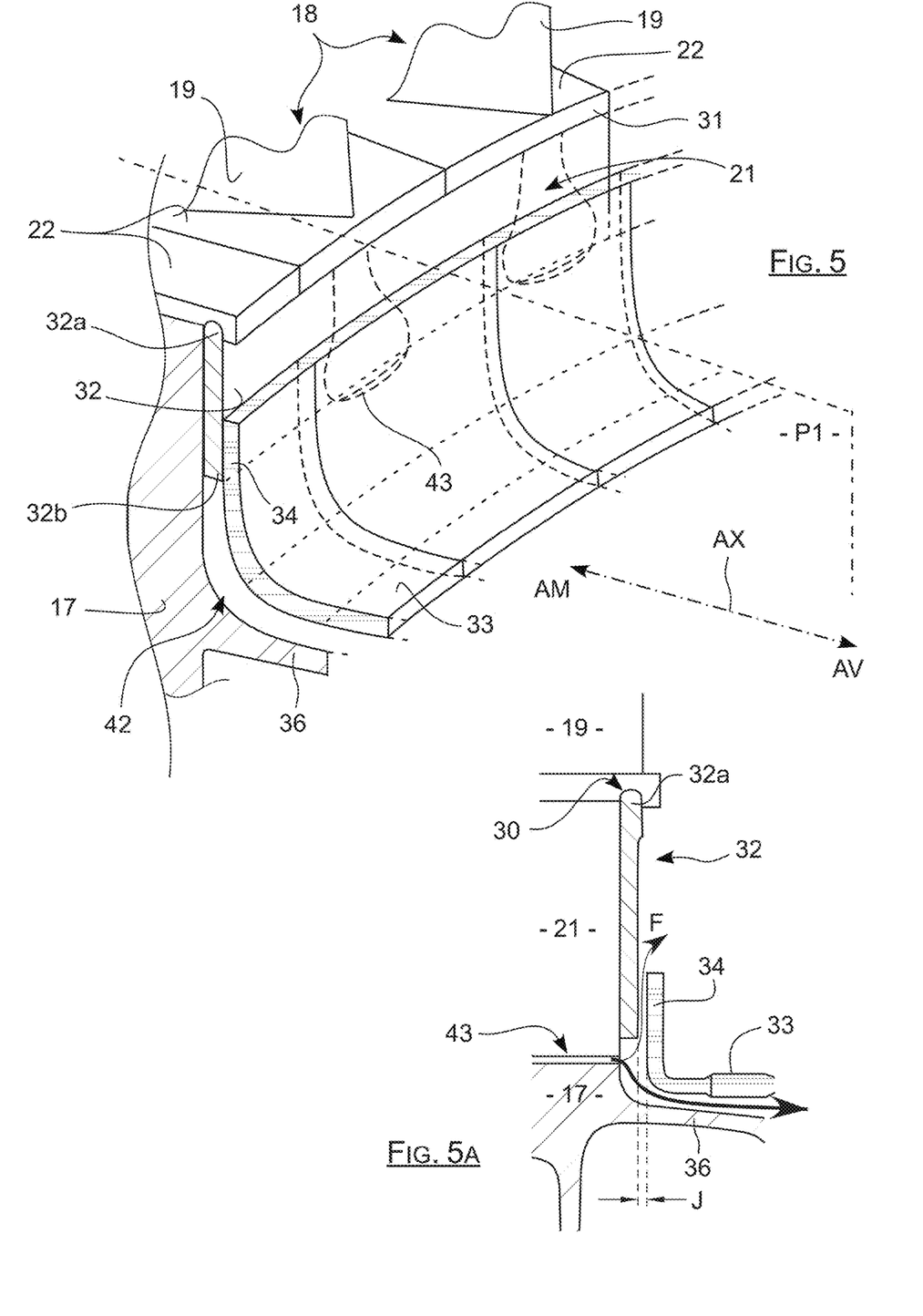
FIG. 5 is a partial perspective view of a turbine unit with a radially continuous member for axially retaining a blade that is subjected to a leak issue.
FIG. 5A shows a cross-section of FIG. 5 along the plane P1, illustrating a leak issue.

Hereinafter, a turbine unit will be described in an upstream-downstream direction, comprising a rotor disc 17 followed by a distributor 26 in reference to FIGS. 4 and 5. It should be noted that the invention as it will be described can be applied to all the discs of the turbine, or only to some of them. Moreover, the designation upstream/downstream is understood according to the direction of insertion of the blade roots 21 in the cells 23 provided for this purpose, which also corresponds to the general direction of the gases in the turbine engine.

The platform 22 of the rotary blades 18 has two opposite axial ends forming a spoiler or lip. This is a downstream spoiler 31 located downstream of the airfoil 19 and an upstream spoiler not shown located upstream of this airfoil 19. The axial blocking, in other words along AX, of the rotary blades 18 on the rotor disc 17, is ensured by an axial retention device. This axial retention device comprises a member 32 for axially retaining the blades which is centred according to the axis AX, and applied against a peripheral downstream part of the rotor disc 17, and an annular flange 33. The member 32 is axially fastened onto the blades at its outer periphery 32a, inserted into a cavity 30 provided for this purpose at the blade platforms 22. It is also axially pressed against the rotor disc 17, and in particular the downstream faces of the roots 21, at its inner periphery 32b, by the flange 33. The inner periphery 32b of the member 32 is designated as the part closest to the axis AX, and its outer periphery is designated as its part farthest from the axis AX.

The flange 33 projects from an auxiliary ring labelled as 35, while extending axially towards upstream and radially following at a distance the contour of a downstream fastening rim 36, and ends in an annular bearing end 34 flared and applied against the retaining member 32. This flange 33 is a part constrained to rotate with the rotor disc 17. More precisely, the downstream fastening rim 36 projects from the rotor disc 17 to ensure the rigid connection of the latter to the successive downstream disc (not shown) also extended by an upstream fastening rim 37, the downstream and upstream rims 36 and 37 coupling together while clinching the auxiliary ring 35.

In the example illustrated, the auxiliary ring 35 is extended downstream by a skirt 38 provided with strips 38a and 38b that cooperate with a block of abradable material 41 carried by the ferrule sector 29 associated with the fixed distributor blade 27 in such a way as to form a labyrinth seal.

The flange 33, in addition to ensuring the maintaining of the retaining member 32 in snug bearing against the rotor disc 17, also participates in a function of cooling of the rotor disc 17 by defining, with the rim 36, a passage for air flow 42 that communicates with channels for air flow 43. These channels, generally extending mainly axially, are each defined between a blade root and the corresponding cell which is formed in the disc 17 and in which the root is installed. The passage for air flow 42 and the channels for air flow 43 together form a cooling circuit of the rotor disc 17. It is understood here that the annular bearing end 34 and the retaining member 32 extend radially outside of the channels for air flow 43 to allow the fluid communication of these channels 43 with the passage 42.

The rotor disc 17, the retaining member 32 and the flange 33 are dimensioned in such a way as to be consecutively snugly bearing once installed in series in the turbine engine. Nevertheless, the appearance of leaks of air, labelled as F, escaping out of the cooling circuit of the disc, in particular at the interface between the retaining member 32 and the flange 33, were observed. Indeed, a linear contact, that is to say circumferentially continuous, of the bearing end 34 on the retaining member 32 is not always ensured, on the one hand, because of possible surface asperities, and on the other hand, because of the phenomenon of differential expansion. In the latter case, the different dimensional variations of the disc, of the retaining member, and of the flange, in the range of operating temperatures of the turbine engine, can cause a separation of the bearing end 34 and of the retaining member 32, labelled as a clearance J in FIG. 5A.

The idea on which the invention is based is therefore to ensure good sealing of the cooling circuit of the disc. In this respect, the major particularity of the invention lies in the formation of a groove, and in the placement of a sealing joint in this groove, to form an obstacle preventing the quantity of air F from escaping.

Figure 6:
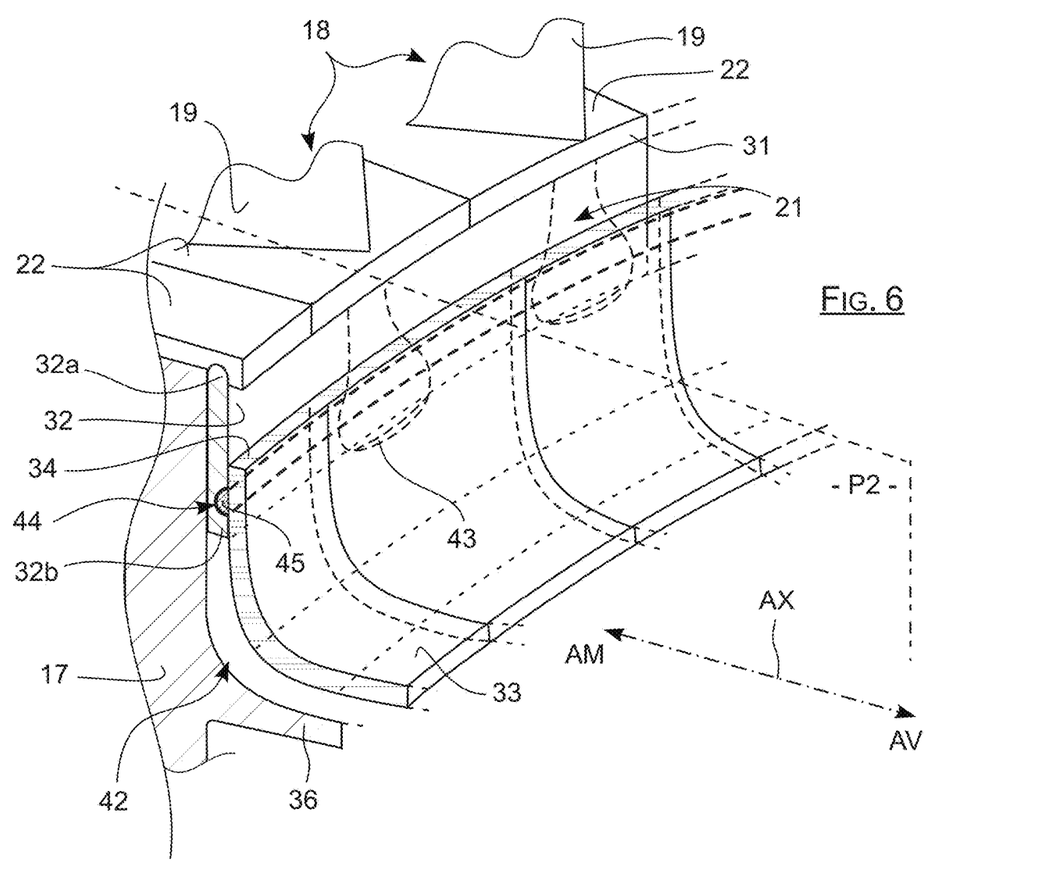
FIG. 6 is a partial perspective view of a turbine unit according to a first embodiment of the invention.
Figure 6A:
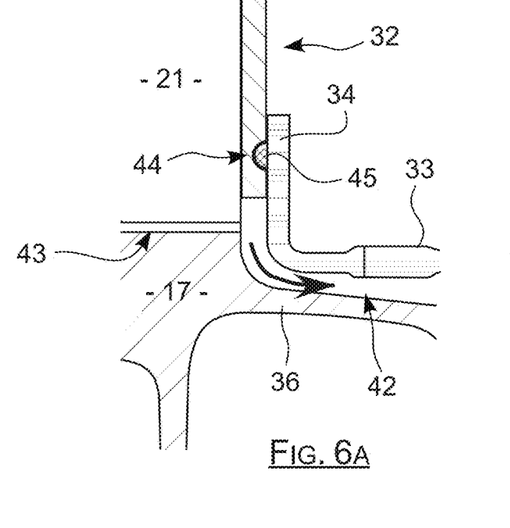
FIGS. 6A and 6B show cross-sections of FIG. 6 along the plane P2, with FIG. 6B illustrating in particular the preservation of the sealing under dimensional variation.
Figure 6B:
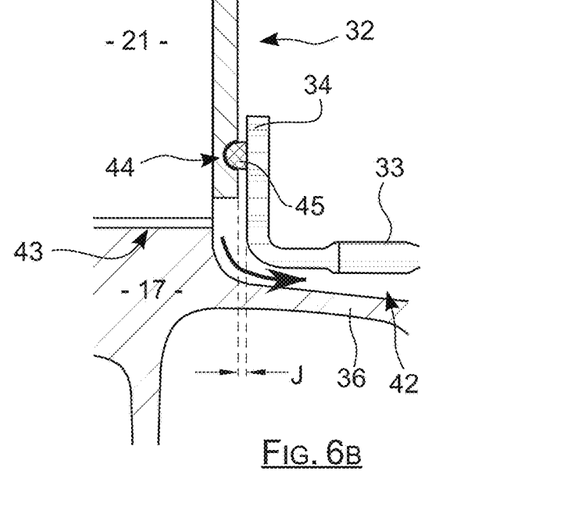

In reference to FIGS. 6, 6A and 6B, according to a first embodiment of the turbine unit, a groove labelled as 44 is formed in the retaining member, which groove 44 opens axially facing the bearing end 34. This groove 44, which extends along the circumferential extension of the retaining member 32, receives an annular sealing joint 45 which is inserted via complementary shape into the latter. The sealing joint 45 is maintained in position in the groove 44 by bearing against the bearing end 34 of the annular flange 33. The joint 45 ensures a continuity of material between the retaining member 32 and the flange 33, and thus prevents the air from escaping out of the cooling circuit of the rotor disc 17 at the interface between these parts.

In a non-limiting way, according to the invention, advantageously, the joint 45 ensures its sealing function in the entire span of operating temperature of the turbine unit, by preserving a contact with the annular flange 33 despite possible differential expansions, as illustrated in FIG. 6B.

According to a first alternative, for this purpose, according to the invention, this joint 45 is reversibly compressed during its installation, that is to say once inserted into the groove 44 and crushed in the latter by the annular flange 33 that is pressed against the retaining member 32. In the example of the drawings, this compression is obtained with the groove 44 and the associated joint 45 respectively having a cross-section having a contour in the shape of a half-circle and in the shape of a circle. With this arrangement, it is understood that the contact of the joint 45 against the flange 33 can be maintained despite geometric variations of the turbine unit due to the variations in operating temperatures, with the joint making up for the clearance J by seeking to go back to its circular initial shape. It is understood that the invention is not limited to this particular combination of shape of groove/joint, and allows any type of shape as long as the joint forms a barrier preventing the air from escaping. Thus, according to the invention, according to this first alternative, the joint 45 is formed with a material, the elasticity index of which allows it to make up for the clearance J.

The thermal expansion is a function of the temperature span, of the intrinsic expansion coefficient of the materials used and of the initial dimensions of the components. In this respect, according to the invention, in a second alternative the joint 45 is formed with a predefined thickness and material, chosen according to those defined for the rotor disc 17, the retaining member 32 and the flange 33, to form an athermal assembly, that is to say in which an expansion of the joint is sufficient to make up for the clearance J in the entire span of operating temperature of the turbine assembly. With this solution, it is understood that the use of a deformation of the joint during its installation is not necessary.

In general, sealing joints are made from elastomers, characterised by a low permeability to gas and by an expansion coefficient greater than that of metals. Given that the disc, the flange and the retaining member are metal elements, the use of a joint of the elastomer type is particularly effective for tending towards an athermal assembly.

Finally, according to a third alternative, the nature of the joint and its thickness, and consequently the dimensioning of the groove, are set by evaluating the parameters associated with the two alternative discussed above, in particular by taking into account the result of an effect of elastic return of the joint having undergone compression during the assembly and of its post-assembly dimensional variation under temperature. The taking into account of these two parameters allows in particular to cover the greatest assortment of materials eligible for the formation of such joint 45.

Figure 7:
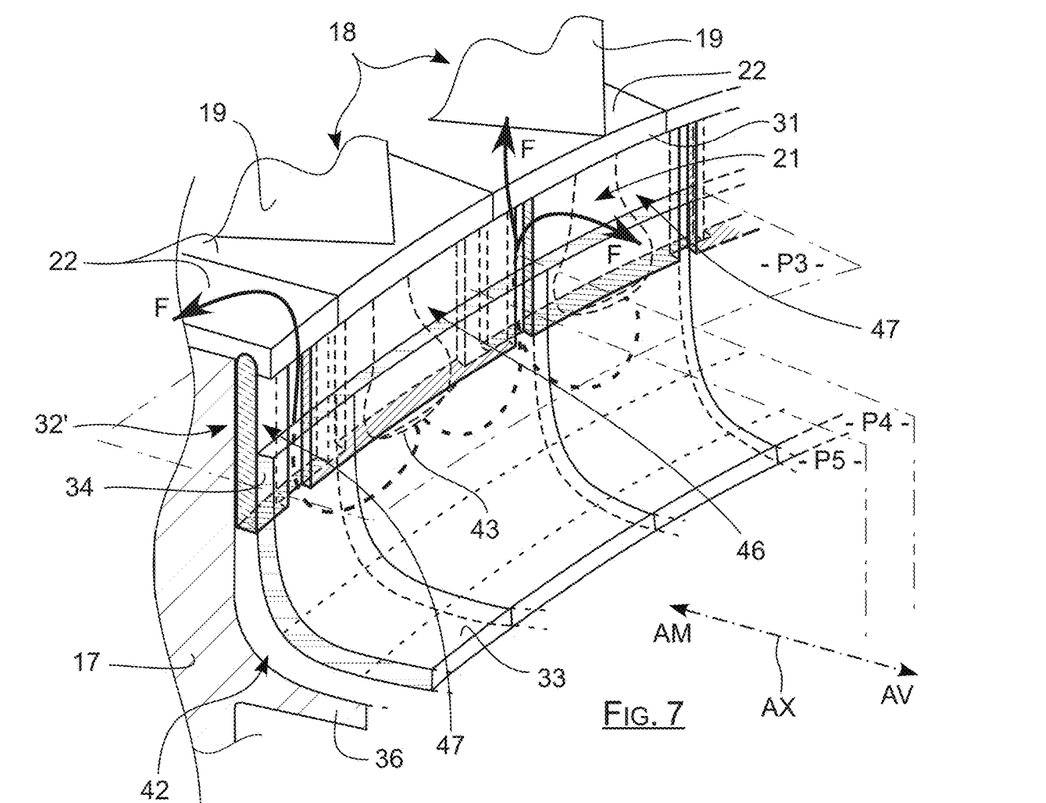
FIG. 7 is a partial perspective view of a turbine unit with a member for axially retaining a blade formed through the assembling of first and second angular segments in alternation, which is subjected to a leak issue.
Figure 7A:
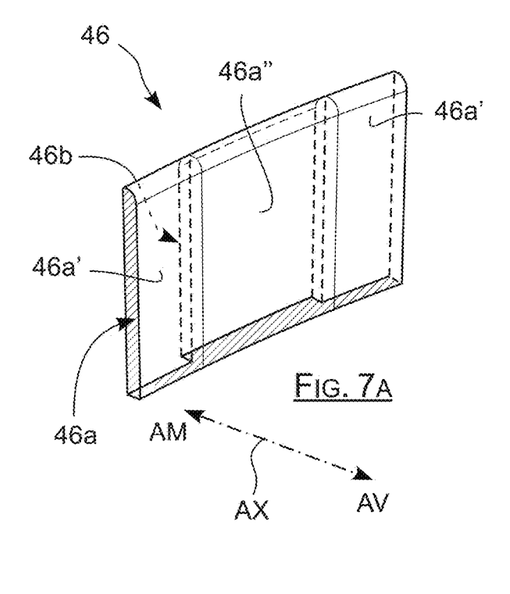
FIGS. 7A and 7B respectively show a first segment and a second segment of FIG. 7.
Figure 7B:
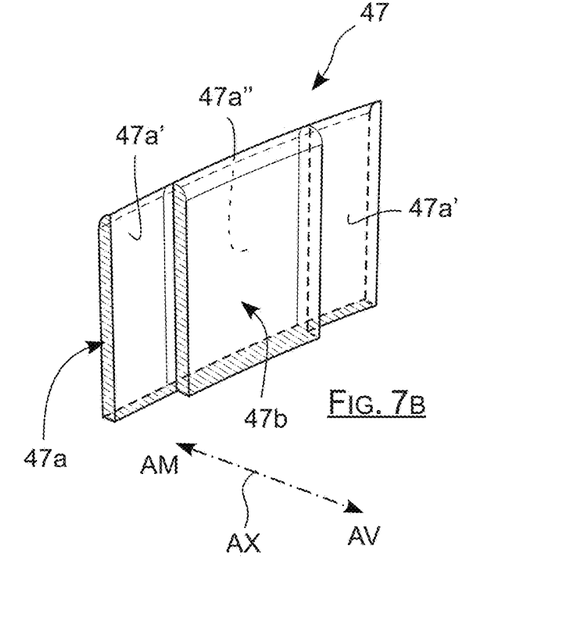

It can be desired for the retaining member to be split into sectors, in other words formed from a juxtaposition of a plurality of segments because of simplified manufacturability in comparison to a one-piece member over 360° used in the first embodiment. According to such architecture, as illustrated in the example of FIGS. 7, 7A and 7B, the retaining member, labelled as 32', comes from an assembly of an alternation of first and second angular segments respectively labelled as 46 and 47. The first and second angular segments 46 and 47 are advantageously similar, in such a way as to not call into question the overall balance of the turbine. These first and second angular segments 46 and 47 each comprise a respective body 46a, 47a having a flat shape, and an axially protruding median part 46b, 47b, which extends at a distance from the circumferential ends of the respective body 46a, 47a. The axial orientation of the first angular segments 46 is the inverse of that of the second angular segments 47, in such a way as to observe an overlapping of the first and second segments juxtaposed circumferentially, at the bodies 46a, 47a on either side of the median part 46b, 47b, as shown by FIG. 7. In other words, each body 46a, 47a comprises two overlap parts 46a', 47a' located on either side of a respective support part 46a", 47a"

from which the median part 46b, 47b of the first and second segments 46 and 47 axially extends. Non-limitingly, according to the invention, advantageously, the axial thickness measured at the body 46a, 47a is the same as that measured at the median part 46b, 47b, and in particular the thicknesses of the first segments are identical to those of the second segments. With this dimensioning, it is understood that a manufacturing in series of the first and second segments 46 and 47 on the same production line is possible regardless of their intended location.

The first angular segments 46 bear on the disc at the median part 46b only, while the contact occurs both at the body 47a and in the case of the second angular segments 47. Because of the fact that the overlapping of the bodies 46a, 47a, at the overlap parts 46a', 47a' facing each other axially, increases the inter-segment contact surface, this configuration allows good sealing despite the sectored nature of the retaining member 32'. In practice, according to the invention, advantageously, and non-limitingly, each blade root 21 is axially facing a median part 46b of a first segment 46 or a support part 47a" of a second angular segment 47, to best take up the transmission of the pressing stress of the flange 33 to the roots 21. It is understood that this arrangement has been explained according to the arbitrary choice of designation of the first and second segments carried out in the illustration of the drawings.

Figure 7C:
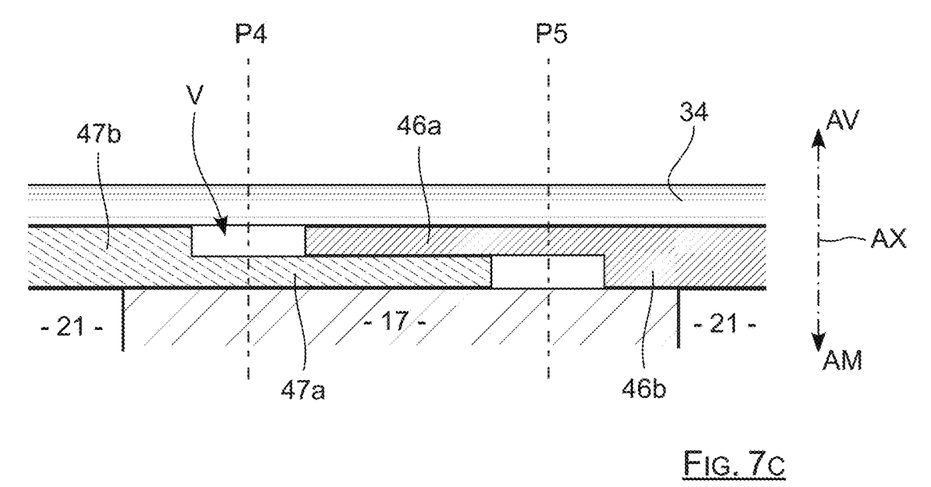
FIGS. 7C, 7D and 7E show cross-sections of FIG. 7 along the planes P3, P4 and P5 respectively.
Figure 7D:
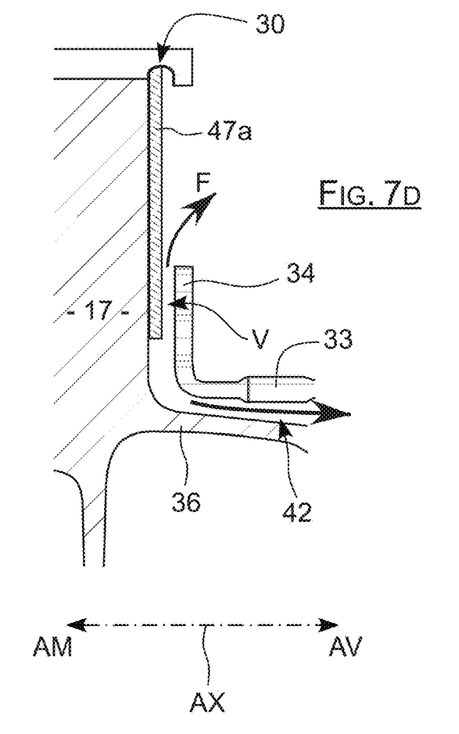

However, a linear contact, that is to say radially continuous, between the median portion of one and the body of the following in general cannot be perfectly ensured. As a result, the bearing end 34 does not contact the retaining member 32' between two consecutive angular segments, designated by slots and labelled as V in FIG. 7C. With this architecture, it is understood here that the issue of the invention remains unsolved while being exacerbated due to the fact that the air can escape at all times and for any temperature span at the slots V that radially pass through the retaining member 32', as illustrated by thick arrows in FIG. 7, and visible in more detail in FIG. 7D. It thus becomes crucial to ensure good sealing, in particular at the slots V, to force the flow of cool air to conform to the surface of the rotor disc 17 by following the passage 42.

Figure 7E:
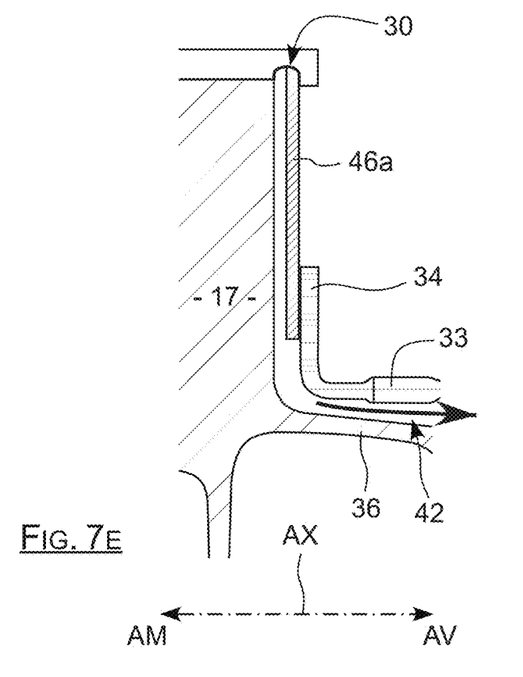

As a corollary, an absence of contact between the retaining member 32' and the disc 17 is observed, between two consecutive angular segments, but this particularity does not cause a leak insofar as the outer periphery 32a of the retaining member 32' is inserted into the cavity 30 at the blade platforms 22, as illustrated in detail in FIG. 7E.

Figure 8:
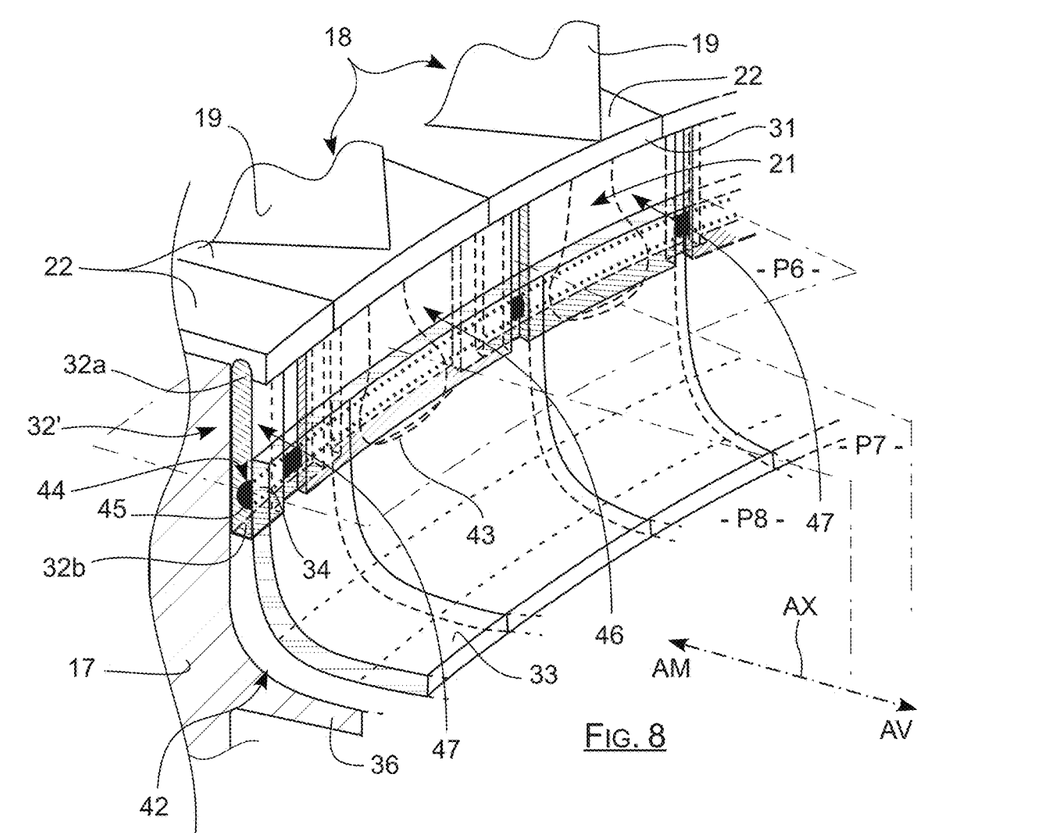
FIG. 8 is a partial perspective view of a turbine unit with an axial retaining member formed through an alternation of angular segments and equipped with a joint according to a second embodiment of the invention.
Figure 8A:
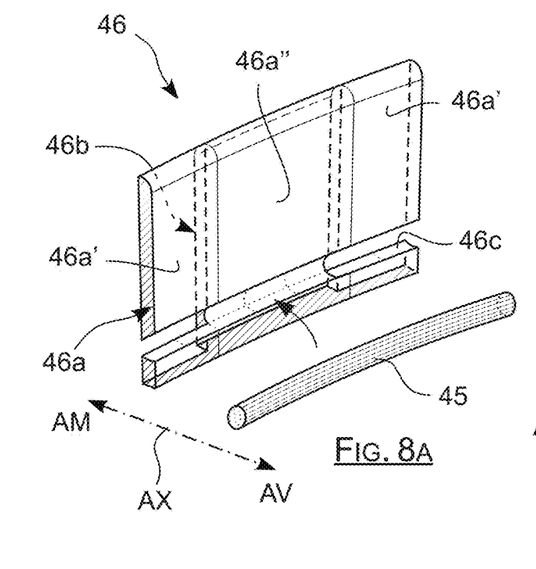
FIGS. 8A and 8B show an exploded view of the angular segments and the joint of FIG. 8.
Figure 8B:
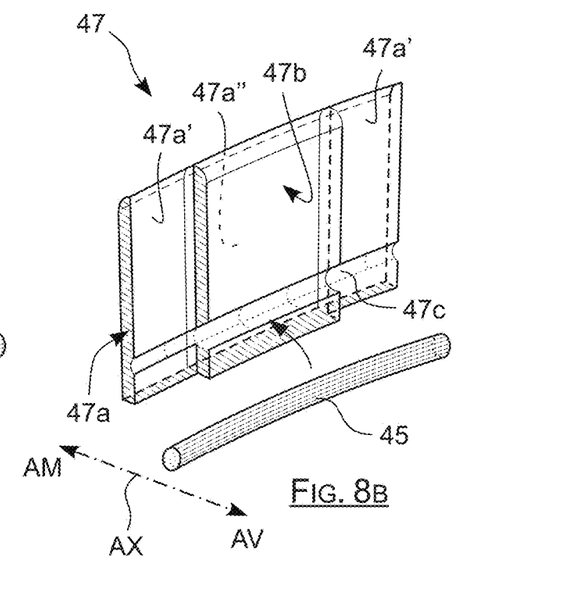

Concretely, the groove/sealing joint pair according to the invention also has a use for such architecture of retaining member 32'. In this respect, according to a second embodiment of the turbine unit as illustrated in FIGS. 8 to 8E, the retaining member 32' comprises such alternation of first and second angular segments 46 and 47 as illustrated in FIG. 7.

These first and second segments 46 and 47 are each provided with a respective groove segment 46c and 47c. The groove segments 46c and 47c are formed in such a way as to be in the continuation of each other once the retaining member 32' has been assembled, so that these groove segments form a groove 44 extending along the circumferential extension of the retaining member 32', like in the case of the first embodiment. An annular sealing joint 45, the conformation of which is similar to that described in the first embodiment, is inserted into the groove 44 and bears on the bearing end 34 to form an obstacle preventing the quantity of air F from escaping.

Figure 8C:
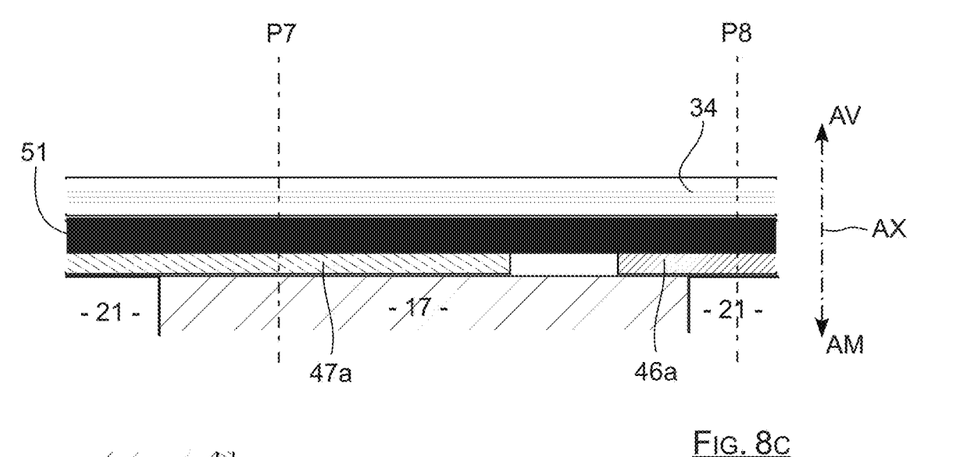
FIGS. 8C, 8D and 8E show cross-sections of FIG. 8 along the planes P6, P7 and P8 respectively.
Figures 8D, 8E:
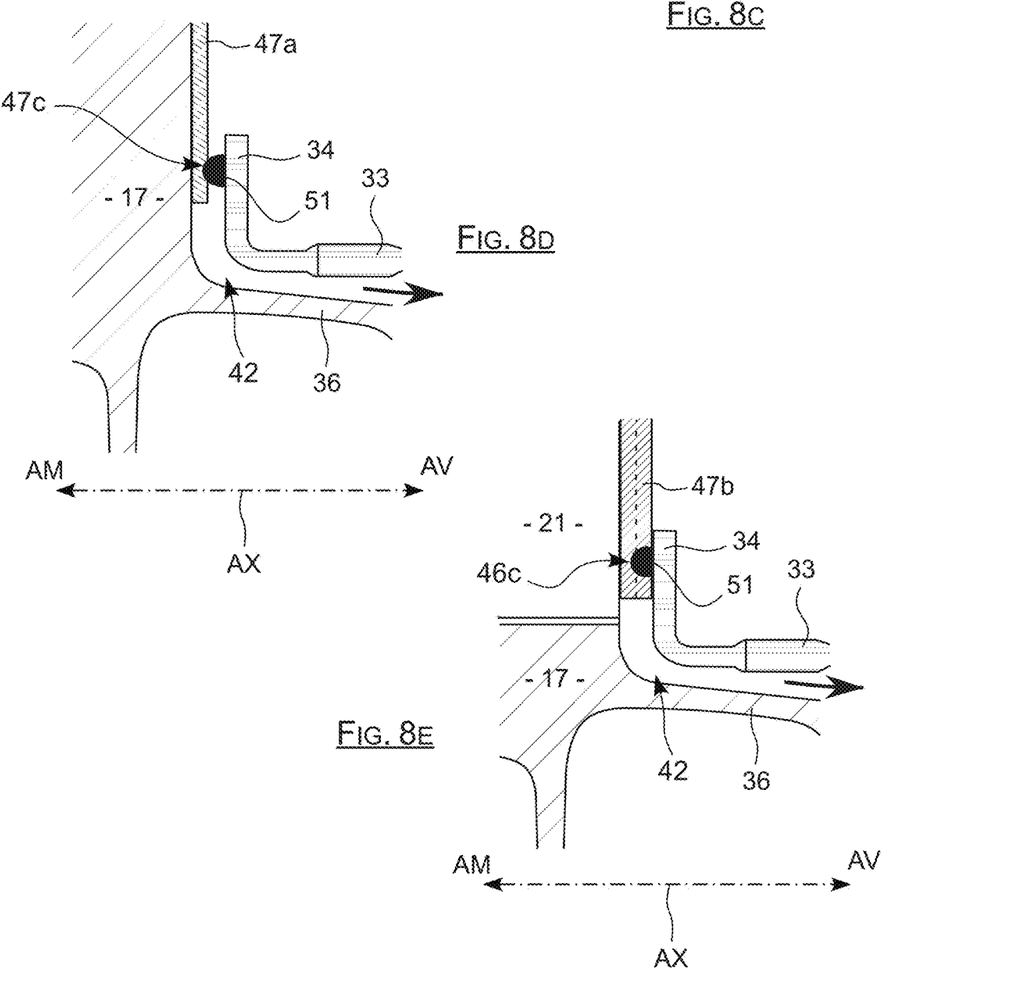

Moreover, according to the invention, advantageously, these groove segments 46c and 47c are formed in such a way that the joint 45 completely covers the slots V as visible in FIG. 8C. For example, it is understood here that in the context of segments having thicknesses measured at the body or at the median portion which are identical, the groove segments extend axially beyond half of the angular segments in the direction from downstream AV to upstream AM. More precisely, in the case of the first angular segment 46, the removal of material performed extends over the entire axial extension of the body 46a, until it trims a part of the median portion or body 46a, as visible in FIG. 8A. With regard to the second segment 47, the corresponding groove segment 47c extends axially beyond the median part 47b while trimming a part of the body 47a to form the bottom of this groove segment 47c.

However, it should be noted that the invention is not limited to this particular groove-segment morphology aiming to maximise the sealed overlapping of the joint and thus limit any risk of a leak, and allows to limit its axial extension as soon as there still remains a contact between the joint and the annular flange 33, even if the slots V are not covered in their totality.

Thus, like in the first embodiment, according to the invention, advantageously, in the second embodiment the joint/groove pair is adapted to make up for a clearance created between the annular flange 33 and the retaining member 32 because of the differential expansion. The joint 45 preferably has, in accordance with the three alternatives mentioned in the context of the first embodiment, a capacity for elastic deformation under compression stress, and/or a coefficient of thermal expansion substantially greater than that measured for the material(s) used to form the disc, the flange and the retaining member.

In the second embodiment, the first and second angular segments 46 and 47 have been described as relating preferably to a body extended axially by a median portion. However, the invention is not limited to this arrangement, with it being understood that the groove/joint pair remains applicable in the case of segments having a constant thickness which are disposed end to end, with their thickness edge as the only contact.

In the first and second embodiments, the invention has been described as relating to a turbine unit characterised by the addition of a groove/sealing joint pair, the groove 44 being a volume hollowed out in the retaining member, and into which the sealing joint 45 is inserted while bearing against the bearing end 34 of the annular flange 33.

Figure 9A:
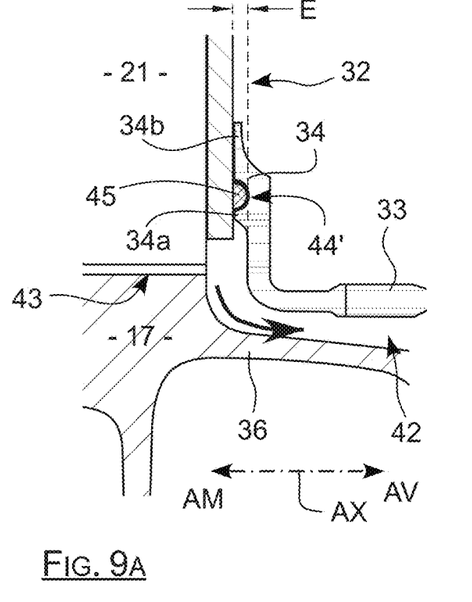
FIGS. 9A and 9B show cross-sections of a turbine unit according to a third embodiment of the invention.
Figure 9B:
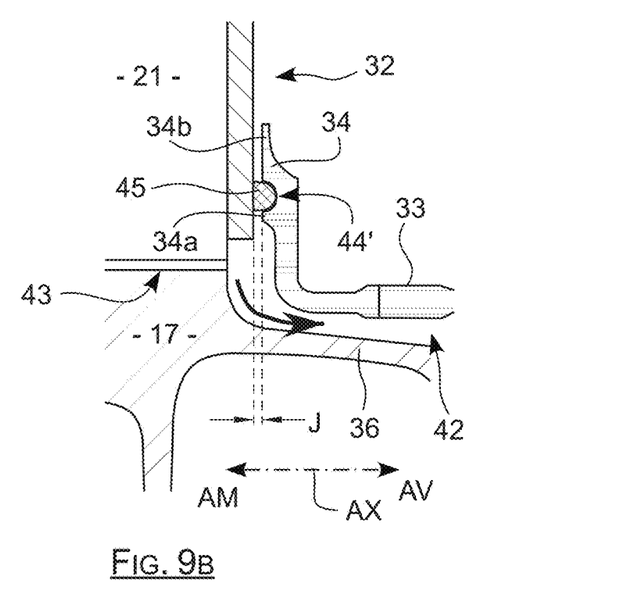

However, the invention is not limited to this particular arrangement. According to a third embodiment, the invention differs from the first or from the second embodiment in that it provides for an inverse arrangement of the groove/sealing joint pair, that is to say with a groove, labelled as 44', which is formed in the bearing end 34 and axially facing the retaining member 32, as shown in FIG. 9A. The sealing joint 45 is thus maintained in the groove 44' by bearing against the retaining member 32. Likewise, the joint 45 is advantageously provided to make up for a clearance J created between the retaining member 32 and the flange 33, as shown in FIG. 9B. For this purpose, the nature and the dimensioning of the joint 45, and indirectly the dimensioning of the associated groove 44', are defined in a non-limiting way according to one of the three alternatives described in the first embodiment. With this arrangement, it is understood that the invention confers the same effect of plugging at the interface defined between the retaining member and the flange as in the context of the first embodiment.

In the case of this inverse arrangement of the joint, according to the invention, in a non-limiting manner, the bearing end 34 is formed with an extra thickness noted as E that is oriented towards the retaining member and in which the groove 44' is made, as illustrated in FIGS. 9A and 9B. This results in the formation of a first bearing portion noted as 34a and a second bearing portion 34b located radially on either side of the groove 44' and at which the retaining member/flange contact occurs. In particular, the second bearing portion 34b, corresponding to the radial ending of the bearing end 34, is in the form of a tab that extends radially in such a way as to increase the contact surface between the flange 33 and the retaining member 32, in comparison to a bearing end 34 free of extra thickness E. This particularity allows to favour the pressing of the joint 45 against the retaining member 32. Thus, the thickness of this second portion 34b, measured axially, reduces as it moves away from the axis AX via the formation of a hollow, that is to say a curve, thus aiming to increase the contact surface without requiring a significant addition of mass.

Figure 10A:
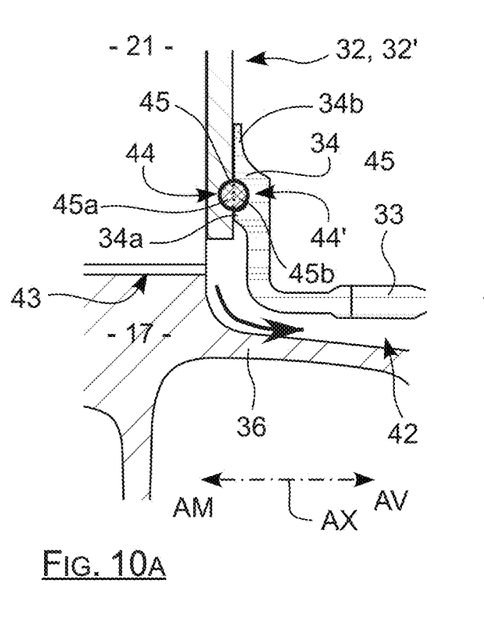
FIGS. 10A and 10B show cross-sections of a turbine unit according to a fourth embodiment of the invention.
Figure 10B:
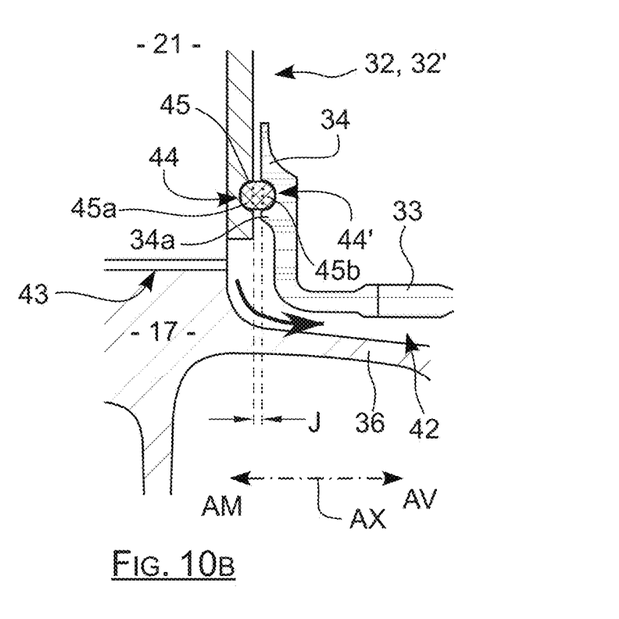

Finally according to a fourth embodiment, the turbine unit, in reference to FIGS. 10A and 10B, has the particularity of associating two grooves facing each other, with a groove 44 formed in the retaining member and a second groove 44' formed in the bearing end 34. The designations 44 and 44' correspond respectively to those used in the other embodiments with respectively a groove 44 formed in the retaining member and a groove 44' formed in the annular flange 33. The sealing joint 45 is maintained in position between the retaining member and the bearing end 34 by the joint effect of its bearing against the retaining member and its bearing against the bearing end 34 of the annular flange 33. Here, an upstream joint portion 45a that is inserted into the groove 44 of the retaining member, and a downstream joint portion 45b that is inserted into the groove 44' of the bearing end 34 are in particular distinguished. With it being understood that the joint here is shared by the two groove/joint pairs, this arrangement confers both better radial maintaining of the retaining member, the joint ensuring the preservation of the axial alignment of the grooves 44 and 44' via complementary shape, and better sealed covering given that the contact surface of the joint against the retaining member 32 and the annular flange 33 is extended. Moreover, the fourth embodiment of the invention can be applied regardless of the architecture of the retaining member in question, in particular whether it is formed in one piece over 360° as labelled as 32 in the case of the first and third embodiments, or whether it is split into sectors as labelled as 32' in the case of the second embodiment. As visible in FIGS. 10A and 10B, the bearing end 34 has in a non-limiting manner a shape corresponding to that presented in the case of the third embodiment in order to favour the maintaining of the joint 45.

Thus, like in the first, second and third embodiments, according to the invention, advantageously, the joint 45 makes up for a clearance J created between the retaining member 32 and the bearing end 34 according to one of the three alternatives described in the first embodiment, as shown in FIG. 10B.

In the example of FIGS. 6 to 10B, the groove 44, 44' has a cross-section having a contour in the shape of a half-circle, and the joint has a cross-section having a generally circular contour in the case of the first, second and third embodiments, or oblong in the case of the fourth embodiment. It is understood that the invention is not limited to this particular combination of shape of groove/joint, and allows any type of shape, preferably complementary, as soon as the joint forms a barrier preventing the air from escaping. It should also be noted that the invention is not limited in that the groove 44, 44', and the associated sealing joint 45, have a circular shape centred on the axis AX as illustrated in the drawings. Concretely, the groove 44 can extend in a sinuous manner, so as to for example circumvent an obstacle, as long as it does not radially project beyond the annular flange 33, with it being understood that otherwise a contact between the joint 45 and the bearing end 34 could not be ensured over the entire circumferential extension of the groove. Likewise, the groove 44' can extend in a discontinuous manner on the bearing end 34, as long as this groove does not radially project beyond the retaining member 32 to preserver a contact between the latter and the joint 45 and thus contain the flow of air propagating in the cooling circuit of the rotor disc 17. In general, the groove and the corresponding joint are free in terms of shape as long as they preserve a component in the circumferential direction and respect a range of radial extension defined between the inner periphery 32b of the retaining member 32 and the outer periphery of the annular flange measured at the bearing end 34. It is understood here that the joint is not limited to an annular shape, with it being understood that its contour is superimposed onto that of the groove.

In the case of the embodiments of FIGS. 6-6B and 8-10B, the joint 45 has been described as relating to an element formed in one piece, in other words continuous over 360°. However, the invention is not limited to this arrangement and provides for the possibility that the joint 45 comes from an association of a plurality of sealing elements split into sectors, in other words each extending over a circumferential sector so that the set of sealing elements covers 360°. Regardless of the shape of the retaining member adopted, that is to say whether it has a constant circumferential extension over 360° or whether it comes from an assembly of annular segments, the use of an annular joint or of a plurality of joint-sector elements joined end to end remains applicable.

The invention has been described at this stage as relating to a joint/groove association, with the groove 44 extending circumferentially over 360° in such a way as to house the joint 45 also having a circumferential extension over 360°, this joint being provided without discontinuity of material or formed from the assembly of joint sectors. The sealing of the cooling circuit of the disc 17 is thus maintained despite possible surface asperities that are covered by the joint 45, despite the presence of the slots V which are also plugged by the joint in the case of a sectored member, and in spite of an axial spacing measured between the annular flange and this retaining member due to variations in temperatures.

Nevertheless, it should be noted that the presence of slots V corresponds to the most critical case with regard to the leaks, with it being understood that the quantity of air escaping through one of them is significantly greater than the quantity of air escaping between the annular flange and the retaining member because of the surface asperities. In this respect, it is possible to equip each slot V with a distinct sealing member with a corresponding circumferential extension to ensure an acceptable sealing. This particularity is in particular sought if the tightening of the annular flange onto the retaining member is such that it ensures their axial maintaining against one another in the entire span of operating temperature of the turbine unit.

Figures 11, 11A:
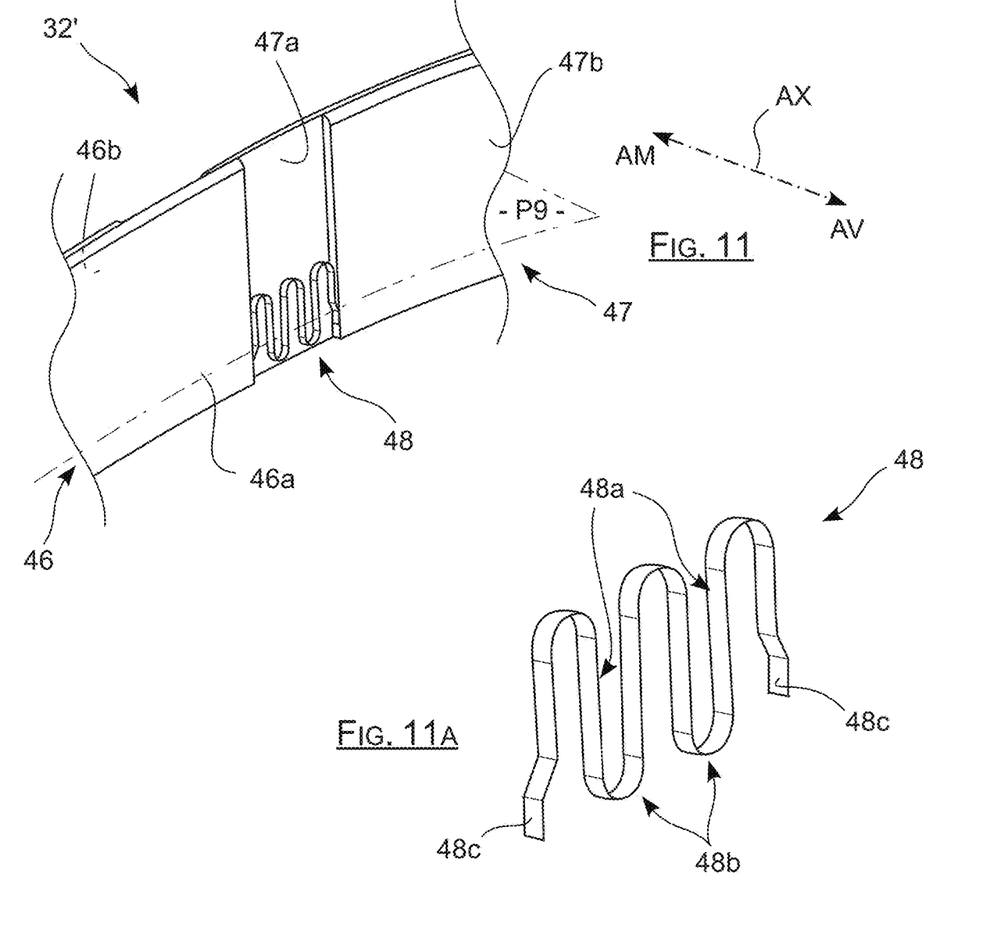
FIG. 11 is a partial perspective view of a turbine unit with an axial retaining member formed by an alternation of angular segments and provided with a sealing member according to a fifth embodiment of the invention.
FIG. 11A is a detailed view of the sealing member of FIG. 11.
Figure 11B:
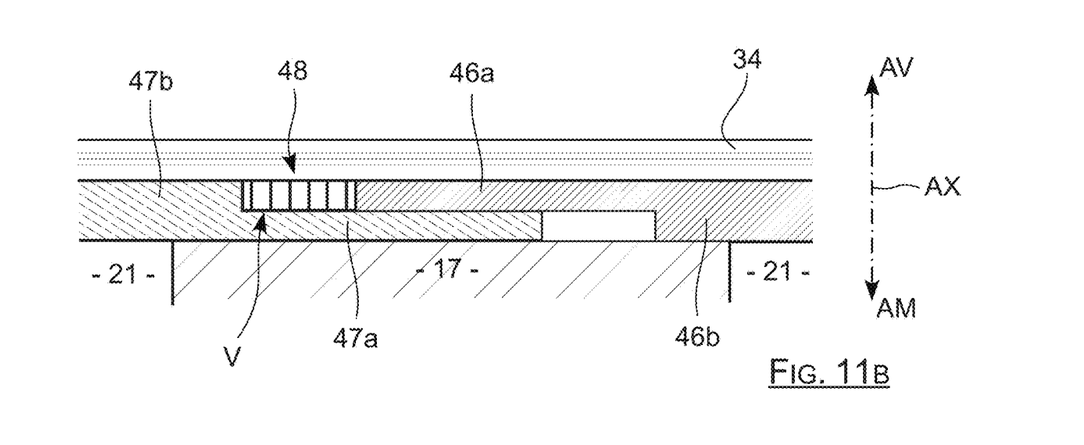
FIG. 11B shows a cross-section of FIG. 11 along the plane P9.

Thus, according to a fifth alternative realisation illustrated in FIGS. 11, 11A and 11B, according to the invention the retaining member 32' is equipped with as many sealing members as there are slots V to plug only the section of passage of air at the latter. Each sealing member, referenced as 48, is in the form of a coil metal strip, in other words in the shape of a bellows, comprising a succession of linear portions 48*a* that extend radially and of curved portions 48*b*, each curved portion connecting two linear portions 48*a*. The sealing member 48 is axially pressed by the annular flange 33 against the retaining member, and also clinched in the circumferential direction between a first and a second angular segments 46 and 47 together defining the slot V in which it is completely housed to ensure the sealing at this slot V. The joint ends each form a lug 48*c* bearing against a circumferential slot end. More precisely one lug bears on the thickness edge of the body 46*a* of the first segment 46 and the other bears on the thickness edge of the median part 47*b* of the second segment.

In order to perform an effective sealing of the slot V in which the sealing member 48 is housed, according to the invention, advantageously, this sealing member 48 is mounted prestressed in the axial direction and axially pressed by the annular flange 33 against the retaining member 32.

The mounting prestressed in the axial direction indicates that the axial thickness of the sealing member 48, before its integration into the slot V, is equal to or greater than that of the slot V after integration, the member remaining thus crushed between the retaining member 32' and the bearing end 34 of the flange 33 once installed.

The mounting prestressed in the circumferential direction means that the distance measured between two linear portions 48*a* before installation in the slot V is greater than that measured once installed. With this arrangement, it is understood that the lugs 48*c* of the sealing member remain pressed against the thickness edge of the associated segment 46, 47, the elastic return of the sealing member 48 tending towards it unbending to go back to its initial shape.

In practice, the sealing member 48 is maintained in position in the circumferential direction by its elasticity and by the tightening of the annular flange 33 on the retaining member 32' in the axial direction. As a result, such arrangement allows to eliminate the formation of a maintaining groove. Nevertheless, it remains possible to provide at least one radial stop that projects from the retaining member in such a way as to prevent the sealing member 48 from being extracted from its position, for the sake of safety of operation.

In particular, the structure in the shape of a bellows and the capacity for deformation of the sealing member 48 allow it to be deformed, by bending and unbending to make up for a geometric variation of the slot V in the circumferential direction, in particular in the case of moving closer together/farther apart of the thickness edges of segments 46 and 47 defining the slot V. The moving closer together/farther apart of the thickness edges of segments 46 and 47 indicates the shrinking or the expansion of the retaining member which is carried out freely during operation, in other words without the sealing member 48 stressing it due to its elasticity.

The second to fifth embodiments have been described, or apply, in the case of a sectored retaining member 32'. It is understood that the invention is not limited to this particular morphology of the retaining member coming from the assembly of an alternation of angular segments 46 and 47, but remains applicable to a retaining member that has at least one slot V at which the annular flange 33 does not bear against this retaining member.

Concretely the addition of the sealing joint forming an interface between the retaining member and the annular flange is adapted to an environment of small bulk. It allows to contain the flow of air propagating in the cooling circuit of the disc and, therefore, makes it more effective for the same quantity of air taken at the upstream of the turbine. With this control of the cooling circuit, it therefore becomes possible to reduce this taking of air which contributes little or not at all to providing energy to the turbine engine, or even occasionally losses of efficiency, without affecting the service life of the components.

It should also be noted that in the case of the groove/joint association of the first to fourth embodiments, in addition to forming a sealing barrier, advantageously ensures the transmission of the pressing stress of the annular flange on the retaining member, despite the differential expansion which breaks the axial contact between these two parts. In other words, the sealing joint 45 is akin to the continuation of the flange against the retaining member 32, to ensure the maintaining of the latter against the rotor disc 17 in the entire span of operating temperatures of the turbine unit.

A reduction in the overall mass of the turbine unit is also observed in the case of a groove/joint association. Indeed, the mass introduced by the joint 45 remains negligible with respect to the effective reduction in mass resulting from the removal of matter to form the groove 44, 44'. In other words, the invention is particularly well adapted to the aeronautical context, by being a part of the overall desire to reduce aircraft in terms of mass in addition to ensuring better sealing of the cooling circuit of the disc.

On the contrary, the addition of the sealing member 48 in the case of the fifth embodiment does not require any modification of the surrounding parts. As a result, an integration into an installed engine that does not have it, that is to say currently in service, is made possible without requiring an additional cost of replacing parts. Moreover, it should be noted that the invention could provide for combining the groove/joint association with a sealing member in the form of a metal strip provided in each of the slots in such a way as to tend towards increased sealing.

Finally, regardless of the embodiment considered, it is possible to form at least one stud which axially projects from the bearing end 34 of the annular flange 33, and in complement form an orifice in the retaining member into which the stud is inserted. This cooperation in terms of shape allows to limit the relative movements between the annular flange and the retaining member 32, 32', in particular a rotation differential, liable to lead to an undesired release of the joint or premature wear of the latter by heating. Also, an inverse arrangement, in particular with at least one stud which projects from the retaining member in cooperation with at least one orifice formed at the bearing end 34, or even mixed, can be chosen without going beyond the context of the invention.

The invention claimed is:

1. A turbine unit for an aircraft turbine engine, comprising:
   a rotor disc (17) that extends about an axis (AX) while being continued axially along the axis (AX) by a rim (36), this rotor disc (17) carrying a plurality of radial blades (18) each comprising a root (21) inserted into a corresponding axial cell (23) formed on the periphery of the rotor disc (17), so that each pair formed by a cell (23) and a root (21) defines, between the cell (23) and the root (21), a channel for air flow (43);
   an annular flange (33), constrained to rotate with the rotor disc (17), extending axially towards the rotor disc (17), and which has a bearing end (34) extending radially towards the outside beyond the channels for air flow (43) while defining together with the rim (36) an air passage (42) communicating with the channels for air flow (43); and a retaining member (32, 32') for axially retaining each of the blades in the corresponding cell (23), this retaining member (32, 32') being applied against the rotor disc (17) by the bearing end (34) of the annular flange (33);

wherein at least one of the retaining member (32, 32') and the annular flange (33) comprises a groove (44, 44') extending in a circumferential direction and formed facing the other of the retaining member (32, 32') and the annular flange (33), a sealing joint (45) being inserted into the groove (44, 44'), and wherein the other of the retaining member (32, 32') and the annular flange (33) axially bears against the sealing joint (45).

2. The turbine unit according to claim 1, wherein the sealing joint (45) is mounted precompressed in the groove (44, 44').

3. The turbine unit according to claim 1, wherein the joint (45) has a coefficient of thermal expansion greater than that of the rotor disc (17), of the flange (33) and of the retaining member (32, 32').

4. The turbine unit according to claim 1, wherein the retaining member (32') comprises at least one slot (V) that radially passes through the retaining member and at which the annular flange (33) does not bear against this retaining member (32'), and wherein the groove (44, 44') is formed in the retaining member in such a way that the sealing joint (45) extends circumferentially at least along this slot (V).

5. The turbine unit according to claim 4, wherein the retaining member (32') is formed by an alternation of first and second angular segments (46, 47) arranged circumferentially and in each of which a respective groove segment (46c, 47c) is formed, so that the respective groove segments (46c, 47c) of the first and second angular segments (46, 47) extend in the circumferential continuation of each other to form the groove (44), the angular segments (46, 47) further defining two by two a slot (V).

6. The turbine unit according to claim 5, wherein the first and second angular segments (46, 47) each comprise a respective body (46a, 47a) having a flat shape, and a median part (46b, 47b) axially protruding and disposed circumferentially at a distance from the circumferential ends of the body.

7. The turbine unit according to claim 4, wherein said at least one slot (V) is equipped with a sealing member (48) running along the entire length thereof, the sealing member (48) being in the form of a coiled metal strip having its circumferential ends each bearing against a circumferential slot end (46b, 47a).

8. The turbine unit according to claim 1, wherein the groove (44') is formed at the bearing end (34) of the annular flange (33), this bearing end comprising a first and a second portions (34a, 34b) provided to bear against the retaining member (32, 32') while being located radially on either side of the groove (44'), and wherein the second bearing portion (34b) has a free radially outer end and is in the form of a tab, the thickness of which decreases as it moves away radially towards the outside.

9. A turbine (8, 9) for an aircraft turbine engine comprising at least one turbine unit according to claim 1, the turbine preferably being a low-pressure turbine (9).

10. An aircraft turbine engine (1) comprising at least one turbine (8, 9) according to claim 9, the turbine engine preferably being a two-spool turbine engine.

11. The turbine unit according to claim 1, wherein the retaining member (32, 32') comprises the groove (44, 44') such that the groove (44, 44') faces the annular flange (33), and wherein the annular flange (33) axially bears against the sealing joint (45).

12. The turbine unit according to claim 1, wherein the annular flange (33) comprises the groove (44, 44') such that the groove (44, 44') faces the retaining member (32, 32'), and wherein the retaining member (32, 32') axially bears against the sealing joint (45).

13. A turbine unit for an aircraft turbine engine, comprising:

a rotor disc (17) that extends about an axis (AX) while being continued axially along the axis (AX) by a rim (36), this rotor disc (17) carrying a plurality of radial blades (18) each comprising a root (21) inserted into a corresponding axial cell (23) formed on the periphery of the rotor disc (17), so that each pair formed by a cell (23) and a root (21) defines, between the cell (23) and the root (21), a channel for air flow (43);

an annular flange (33), constrained to rotate with the rotor disc (17), extending axially towards the rotor disc (17), and which has a bearing end (34) extending radially towards the outside beyond the channels for air flow (43) while defining together with the rim (36) an air passage (42) communicating with the channels for air flow (43);

a retaining member (32, 32') for axially retaining each of the blades in the corresponding cell (23), this retaining member (32, 32') being applied against the rotor disc (17) by the bearing end (34) of the annular flange (33);

a first groove (44, 44') formed in one of the retaining member (32, 32') and the annular flange (33) such that the first groove (44, 44') faces the other of the retaining member (32, 32') and the annular flange (33); and a sealing joint (45) being inserted into the first groove (44, 44'), wherein the other of the retaining member (32, 32') and the annular flange (33) axially bears against the sealing joint (45).

14. The turbine unit according to claim 13, wherein the first groove (44, 44') is formed in the retaining member (32, 32') such that the first groove (44, 44') faces the annular flange (33), and wherein the annular flange (33) axially bears against the sealing joint (45).

15. The turbine unit according to claim 14, further comprising a second groove (44, 44') formed in the annular flange (33) such that the second groove (44, 44') faces the retaining member (32, 32'), wherein the sealing joint (45) is inserted into the first groove (44, 44') and the second groove (44, 44') such that the retaining member (32, 32') and the annular flange (33) axially bear against the sealing joint (45).

16. The turbine unit according to claim 13, wherein the first groove (44, 44') is formed in the annular flange (33) such that the first groove (44, 44') faces the retaining member (32, 32'), and wherein the retaining member (32, 32') axially bears against the sealing joint (45), at least one of the retaining member (32, 32') and the annular flange (33) comprises a groove (44, 44') extending in a circumferential direction and formed facing the other of the retaining member (32, 32') and the annular flange (33), a sealing joint (45) being inserted into the groove (44, 44'), and wherein the other of the retaining member (32, 32') and the annular flange (33) axially bears against the sealing joint (45).

* * * * *